United States Patent

Malik

[11] Patent Number: 6,011,837
[45] Date of Patent: Jan. 4, 2000

[54] MARKETING CONTROL PROGRAM

[75] Inventor: Dale W. Malik, Atlanta, Ga.

[73] Assignee: BellSouth Intellectual Property Corporation, Wilmington, Del.

[21] Appl. No.: 09/102,236

[22] Filed: Jun. 22, 1998

[51] Int. Cl.[7] .................................................. H04M 15/00
[52] U.S. Cl. ........................... 379/112; 379/111; 379/114; 379/124; 379/126
[58] Field of Search .................................... 379/111, 112, 379/114, 115, 116, 120, 121, 124, 126, 127, 196, 197, 207, 183, 154

[56] References Cited

U.S. PATENT DOCUMENTS

| | | | |
|---|---|---|---|
| 5,333,183 | 7/1994 | Herbert | 379/112 |
| 5,511,113 | 4/1996 | Tasaki et al. | 379/112 |
| 5,606,601 | 2/1997 | Witzman et al. | 379/113 |
| 5,832,068 | 11/1998 | Smith | 379/113 |
| 5,850,432 | 12/1998 | Desai et al. | 379/115 |
| 5,878,114 | 3/1999 | Son | 379/13 |

*Primary Examiner*—Curtis A. Kuntz
*Assistant Examiner*—Binh K. Tieu
*Attorney, Agent, or Firm*—Nora M. Tocups; Kilpatrick Stockton LLP

[57] ABSTRACT

A method and system for dynamically managing billing information for telecommunications service application use at the service application level rather than at the billing system level. Each service application, such as a call forwarding service application, is programmed with application level data records in which are stored the parameters of a given promotion, such as number of free uses, the start time and stop time of the promotion or rental period, etc. Each time a service application is subsequently used, the customer's use of the service application is logged in a customer data record. The customer's use is then compared to a corresponding application level data record. Based on this comparison, a billing record is provided to the billing system which instructs the billing system to either bill or not to bill the customer for the particular use of the service application. No adjustment of the billing system is required for particular service application use because the billing system will receive a billing record with instructs it to bill or not to bill. A record for each use of the service may be placed on the customer's bill, but only those uses for which the customer is to be charged will have a corresponding cost entry.

14 Claims, 4 Drawing Sheets

FIG. 6

MARKETING CONTROL PROGRAM

TECHNICAL FIELD

This invention generally relates to the field of telecommunications. This invention more particularly relates to managing billing data associated with the provision of telecommunications services including promotional uses and rented uses of telecommunications service applications.

BACKGROUND OF THE INVENTION

In recent years the growing use of telecommunications services has necessitated a need for advanced telecommunications service applications, such as call forwarding, call waiting, caller identification, and the like. Generally, an advanced service application is an application that provides features or functions that are not usually provided within a local switching system, that are relatively complex, that require coordination of multiple systems, and that are implemented typically through the use of data communications between or among a variety of telecommunications network elements.

In order to compete in the growing telecommunications industry, providers of telecommunications services offer a variety of promotional services as a part of their overall marketing strategy. For example, in order to increase sales of subscriptions to a call forwarding service application, a telecommunications service provider may offer twenty free uses of the call forwarding service application when the customer subscribes to the application. Telecommunications service providers may also offer a variety of rentable services. That is, a customer may rent a service application, such as call forwarding, for some period of time, for example, forty-five days.

Offering such promotional services as a part of the marketing strategy of the telecommunications service provider presents problems for the service provider's billing system. In a typical setting, for every use of a given service application, a billing record is sent blindly to the service provider's billing system whether the use was a free use or whether the use was to be charged to the customer via the customer's periodic bill. Ultimately, each use provided on the billing record corresponds to an entry on the customer's bill. When a customer has received free uses of a given service application as part of a promotion, or if the customer has rented the application for a set period of time or for a set number of uses, personnel in the billing system of the telecommunications service provider must program or adjust the billing system so that the customer will not be charged for the free uses or for the predetermined (often pre-paid) rented uses. That is, the billing system must adjust the billing system for each customer, each service application, and must sort out which uses of a particular service application were free or perhaps prepaid under a rental agreement.

Such adjustment of the service provider's billing system is cumbersome, time consuming and costly. In addition, such adjustment of the billing system sometimes results in billing entries for free or prepaid rented uses being omitted from the bill which is ultimately forwarded to the customer. However, often it is useful to provide the customer a bill containing a record of all uses of the service, even free or prepaid uses so that the customer receives a full accounting of his or her use of the service.

Accordingly, there is a need for a method and system for managing billing information for service application usage that is time efficient and cost efficient.

There is further a need for a method and system for managing billing information for service application usage at the service application level without the need for making adjustments to the telecommunications service provider's billing system.

SUMMARY OF THE INVENTION

The present invention satisfies the above described needs by providing a method and system for dynamically managing billing information for service application usage at the service application level rather than at the billing system level. That is, each service application, such as the call forwarding service application, is programmed with application level data records in which are stored the parameters of a given promotion, such as number of free uses, the start time and stop time of the promotion or rental period, etc.

Each time a service application is subsequently used, the customer's use of the service application is logged in a customer data record. The customer's use is then compared to a corresponding application level data record. Based on this comparison, a billing record is provided to the billing system which instructs the billing system to either bill or not to bill the customer for the particular use of the service application. Thus, no adjustment of the billing system is required for the promotion or rental because the billing system will receive a billing record with instructs it to bill or not to bill. A record for each use of the service may be placed on the customer's bill, but only those uses for which the customer is to be charged will have a corresponding cost entry.

Thus, the method and system of the present invention serve as screening mechanisms between the particular service application and the billing system so that information received by the billing system defines whether each use of the particular service by a given customer is to be charged to the customer or not. Accordingly the billing system can remain generic, as no adjustments to the billing system will be required to account for promotional or rented uses of particular service applications.

One aspect of the present invention provides a method for managing billing information associated with the use of a telecommunications service application. A first record is created for containing information representing use parameters of the service application. A second record is created for containing information associated with use of the service application. The information contained in the second record is updated upon use of the service application. A comparison is made of the information contained in the second record to information contained in the first record. In response to comparison of the information contained in the second record to the information contained in the first record, a determination is made whether to generate a charge associated with the use of the application.

Preferably, if a determination is made to generate a charge, a billing record is generated containing information which indicates a charge should be generated. However, if a determination is made not to generate a charge, a billing record is generated containing information which indicates a charge should not be generated. After the billing record is generated, the billing record is sent a billing system. The method may delete the second record at a stop time, the stop time being a use parameter represented by information contained in the first record.

Updating the second record upon use of the service application preferably includes incrementing a count of uses of the service application after each use of the service application. Comparing the information contained in the second record to the information contained in the first record preferably includes comparing the count of uses of the service application to a maximum number of available uses represented by information contained in the first record. If desired, the second record may be deleted on the next use of the service application after the maximum number of available uses has been reached.

Alternatively, updating the second record upon use of the service application may include incrementing a count of the periods of use of the service application after each use of the service application. Likewise, comparing the information contained in the second record to the information contained in the first record may include comparing the count of the periods of use of the service application to a maximum number of available periods of use represented by information contained in the first record. And, accordingly, the second record may be deleted on the next use of the service application after the maximum number of available periods of use of the service application has been reached.

In another aspect of the present invention, a computer-readable medium having stored thereon a data structure is provided. A first data field contains data representing billing information for the provision of a telecommunication service. A second data field contains data representing an instruction to bill or not to bill.

Other objects, features, and advantages of the present invention will become apparent upon reading the following specification, when taken in conjunction with the drawings and appended claims.

DETAILED DESCRIPTION OF THE DISCLOSED EMBODIMENTS

In accordance with an exemplary embodiment of the present invention, a marketing control program is provided for managing billing information regarding usage of telecommunications service applications, such as call forwarding, call waiting, caller identification, and the like. For purposes the following description a telecommunications service application will be referred to herein as "service application."

The marketing control program of the present invention manages billing information regarding service application usage at the service application level rather than at the billing system level. A usage data record for each application called a global billing adjustment record is programmed at the service application level. The global billing adjustment record contains data representative of the parameters of a given service application promotion or rental. As briefly discussed above, such parameters may include numbers of free uses provided in accordance with the promotion, or the start time and stop time for a given rental period.

Each time an individual customer uses a given service application in accordance with the promotion or with a rental agreement, the customer's use of the service application is logged in a customer based data record called a customer history log. Each time the customer uses the given service application, the information maintained in the customer history log is updated and compared to the information contained in the global billing adjustment record. As a result of this comparison, the service application generates a billing record which is provided to the billing system.

The billing record provided to the billing system contains a data field which indicates whether the particular use of the service application which has caused the generation of this billing record should or should not be charged to the customer. Accordingly, the billing record provided to the billing system contains all necessary information for the billing system to prepare the customer's periodic bill without the need for any adjustments of the billing record to account for the customer's use of the particular service application as a part of the marketing promotion or rental agreement. The components of an exemplary embodiment of the present invention briefly described above, will now be described in detail.

Referring now to the drawings, in which like numerals represent like elements throughout the several figures, aspects of the present invention and an preferred operating environment will be described.

Exemplary Operating Environment of the Present Invention

An exemplary embodiment of the marketing control program of the present invention utilizes a number of telecommunications system network elements. Thus, it is useful to briefly describe an exemplary operating environment of the present invention.

The modern public switched telephone network (PSTN) forms the basic environment of the present invention. The modern public switched telephone network has separate signaling paths for voice signals (or other customer-utilized communication circuits) and for control signals, which include information transmitted throughout the network to control the connection and disconnection of the voice circuits.

Figure 1:
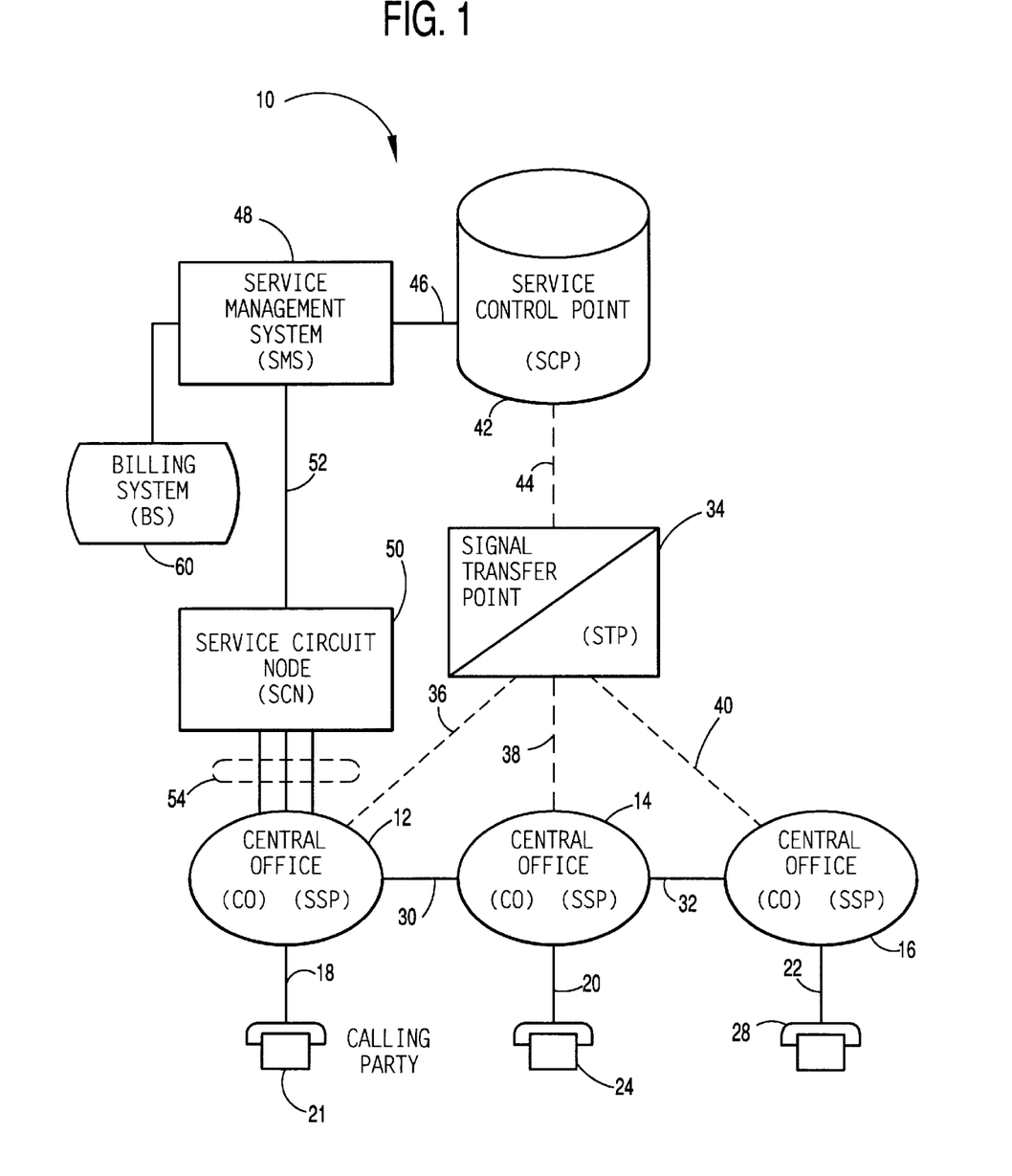
FIG. 1 is a block diagram of a portion of the existing advanced intelligent network (AIN) in a telephone system that forms an exemplary environment for the preferred embodiment of the present invention.

The public switched telephone network that evolved in the 1980s incorporated the advanced intelligent network (AIN). Some of the components of the advanced intelligent network are illustrated in FIG. 1. FIG. 1 is a block diagram representing at least a part of the advanced intelligent network (AIN) 10 of a typical local exchange carrier. The advanced intelligent network (AIN) uses the signaling system 7 (SS7) network for signal or system control message transport. The components thereof are well known to those skilled in the art.

Referring still to FIG. 1, a plurality of central offices is provided in a typical public switched telephone network. As shown in FIG. 1, each central office may include an electronic switch known to those skilled in the art as a service switching point (SSP). These are indicated in FIG. 1 as SSP switches 12, 14, and 16. The number of SSP switches depends on the number of subscribers to be served by the public switched telephone network. An SSP (specifically, a Class 5 central office switch) is the AIN component of a typical electronic central office switch used by a local exchange carrier.

As shown in FIG. 1, central offices switches (SSP) 12, 14, and 16 have a plurality of subscriber lines 18, 20, and 22 connected thereto. Each of the subscriber lines 18, 20, and 22 is connected to a terminating piece or pieces of customer premises equipment that are represented by standard telephone sets 21, 24 and 28. SSP switches 12, 14, and 16 are connected by a plurality of trunk circuits indicated as 30 and 32 in FIG. 1. These are the voice path trunks that interconnect the central offices 12, 14, and 16 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the new enhanced features of the network reside in the local AIN service control point (SCP) 42 that is connected to signal transfer point 34 via SS7 data link 44. As is known to those skilled in the art, service control points, such as SCP 42, are physically implemented by relatively powerful fault tolerant computers.

The processes and operations performed by such computers include the manipulation of signals by a processor or remote server and the maintenance of these signals within data structures resident in one or more local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art. Among the functions performed by the service control points are maintenance of network data bases used in providing enhanced services.

The modern Advanced Intelligent Network 10 also includes intelligent peripheral devices, such as the service circuit node (SCN) 50, illustrated in FIG. 1. Those skilled in the art will be familiar with service circuit nodes, which are physically implemented by the same types of computers that embody the SCP 42. In addition to the computing capability and data base maintenance features, service circuit nodes 50 use ISDN lines and may include DTMF signal recognition devices, tone generation devices, voice synthesis devices and other voice or data resources. As illustrated in FIG. 1, the connection is through the SSP. For example, the SCN 50 is connected to the SCP 42 via ISDN links 54 to the SSP 12, ISDN/SS7 protocol conversion in SSP 12, and SS7 links 36 and 44. Additionally, the service circuit node 50 is connected to service management system (SMS) 48 via a data link 52 that services the SCN 50 in essentially the same way it services SCP 42.

Service circuit nodes, such as the SCN 50, are used principally when some custom feature or service is needed that requires an audio connection to the call or transfer of a significant amount of data to a subscriber over a switched connection during or following a call. As shown in FIG. 1, the service circuit node 50 is typically connected to one or more (but normally only a few) SSP central office switches via Integrated Service Digital Network (ISDN) links shown as lines 54. Thus, services that are implemented during a call (i.e., after completion of ringing or called subscriber pick up) may employ the facility of a service circuit node.

Additional devices for implementing advanced network functions within the AIN 10 are provided by a regional STPs (not shown), regional AIN SCPs (not shown), and a service management system (SMS) 46. Both the regional AIN SCPs and the local AIN SCP 42, which represent a plurality of local AIN SCPs distributed throughout the AIN 10, are connected via respective data links to the SMS 46. The SMS 46 provides a centralized platform for remotely programming the various SCPs of the AIN 10 so that a coordinated information processing system may be implemented for the AIN 10. The SMS 46 is implemented by a large general purpose computer and interfaces to business offices of the local exchange carrier and interexchange carriers. SMSs and SCPs may download, on a non-real time basis, billing information to a billing system 60 that is needed in order to appropriately invoice subscribers for the services provided.

For preparation of billing information, the subscriber's prescribed telecommunications service provider is generally responsible for maintaining records for both local and long distance services and producing billing statements for individual subscribers. The billing system 60 produces these billing statements, which are typically mailed to subscribers on a periodic basis. Information may be downloaded to the billing system 60 in association with the preparation of the billing statements. It will be appreciated that the billing system 60 may prepare records for each subscriber on a per-communication basis. As is well known to those skilled in the art, the billing system 60 includes large general purpose computing devices which can accumulate billing information and produce desired accounting records. The operation of a billing system of a telecommunications service provider, such as the billing system 60, is well known to those skilled in the art.

In operation, the intelligent network elements of the AIN 10, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12, 14, and 16, a relatively small set of triggers are defined at the SSP central office switches for each call.

The message created by an SSP 12 in response to a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bidirectional exchanges between network elements while the transaction remains open. A "response" message closes the transaction opened by the query message, and usually instructs the SSP 12 to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

Marketing Control Program

Figure 2:
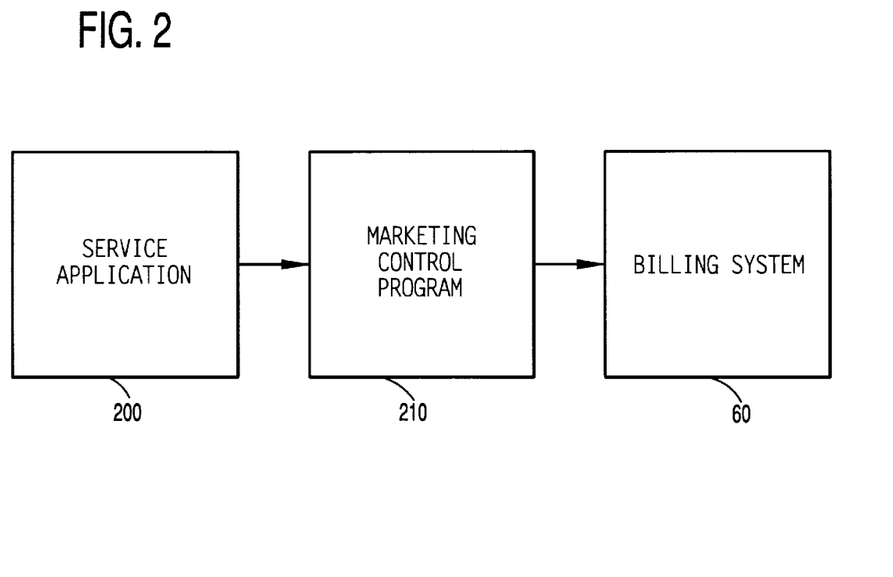
FIG. 2 is a simplified block diagram illustrating the interaction of the marketing control program of the present invention with a telecommunications service application and a telecommunications service billing system.

As briefly described above, the marketing control program 210 of the present invention provides for the management of billing information at the service application level of billing information generated in response to usage of individual service applications. Referring now to FIG. 2, the marketing control program 210 of the present invention serves as a billing information screen between a particular service application 200 and the billing system 60 so that billing records received by the billing system contain information necessary for customer billing without the need for adjustments of the billing system 60. Thus, the billing system 60 may be operated in a generic fashion because billing adjustments will take place at the service application level instead of at the billing system level.

Billing records received by the billing system 60 contain a variety of billing record information related to the telecommunications service used by the customer. As is well known to those skilled in the art, this billing record may contain information such as the duration of the telephone call, the originating telephone number, the terminating telephone number, long distance service information and the like. Importantly, in accordance with an exemplary embodiment of the present invention this billing record information contains information as to whether the customer should be billed or not for his or her use of a particular service application, such as call forwarding used by the customer.

Figure 3:
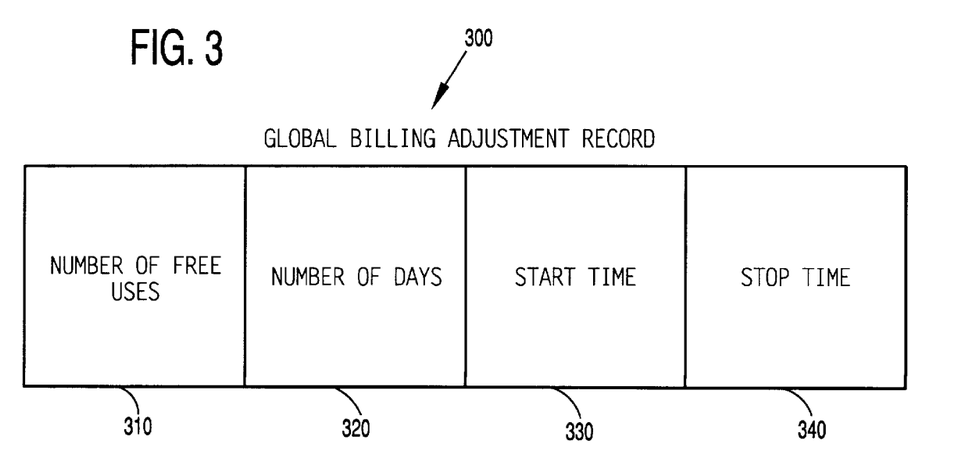
FIG. 3 is a simplified block diagram illustrating an exemplary data structure of a global billing adjustment record in accordance with an exemplary embodiment of the present invention.

In accordance with an exemplary embodiment of the present invention, a global billing adjustment record (GBR) is programmed at the service application level of each service application, such as call forwarding. Referring now to FIG. 3, the data structure of the GBR 300 preferably contains four data fields. The data field 310 contains information which identifies the number of free uses of the given service application are available in accordance with the marketing promotion being run by the telecommunications service provider for the given service application. This number may indicate the maximum number of uses if desired by the promotion developer. The data field 320 contains information which identifies the total amount of time during which the marketing promotion will run. For example, in an exemplary embodiment of the present invention, this data field may contain a number of days during which the marketing promotion may run. The data field 330 contains information which identifies the start time of the marketing promotion and the data field 340 contains information which identifies the stop time of the marketing promotion.

The GBR 300 is a service application level record. Accordingly, the GBR 300 is applicable to all customers who make use of the service application for which the GBR 300 has been programmed. However, as should be understood by those skilled in the art, for customer specific data such as rental of a given service application, the GBR 300 shown in FIG. 3 and described herein may form one of a number of a records contained in a larger global billing adjustment database maintained at the service application level. That is, if various customers rent service applications for different numbers of uses or for different numbers of days, for example, a GBR such as the GBR 300 will be prepared for each customer and will form a part of a larger global adjustment database maintained at the service application level.

In accordance with an exemplary embodiment of the present invention, data is written to the GBR 300 through an intelligent periphery, such as the service circuit node 50 illustrated in FIG. 1. The telecommunications service provider may, for example, call a designated telephone number which will connect the personnel to the service circuit node 50. If desired, a series of voice prompts may be provided which will ask the personnel for information represented by the data fields 310–340 in the GBR 300. For example, the voice prompt may ask for the number of free uses, the number of days, the start time of the promotion and the stop time of the promotion. Information provided in response to the voice prompts will be represented in the data fields.

In the case of a rental of a given service application, such as call forwarding, the information represented in the data fields of the GBR is written to those data fields in a manner similar to the creation of the GBR 300, as described above. In a preferred embodiment, when a customer rents a given service application 200, the customer's rental information is written to the GBR 300 via an intelligent peripheral device, such as the service circuit node 50. In a preferred embodiment, the customer may call a designated telephone number for set-up of the rental agreement or service application subscription. A series of voice prompts will obtain information from the customer such as the number of days for which the customer wishes to rent the given service application 200, or the number of uses for which the customer wishes to rent the given service application 200. This information along with the customer telephone number is used as an identification for the customer will be written to the GBR 300.

Each time a service application is used after the GBR 300 is created, the customer's use of the service application is compared against the data contained in the GBR 300 to determine whether the billing record provided to the billing system 60 should instruct the billing system to bill or not to bill the customer for that use of the service application. In order to make this comparison, each time a customer uses a given service application 200 as a part of the marketing promotion or rental agreement, an exemplary embodiment of the present invention provides for the creation of a customer usage data record called a customer history log in which the customer's use of the service application 200 is recorded.

Figure 4:
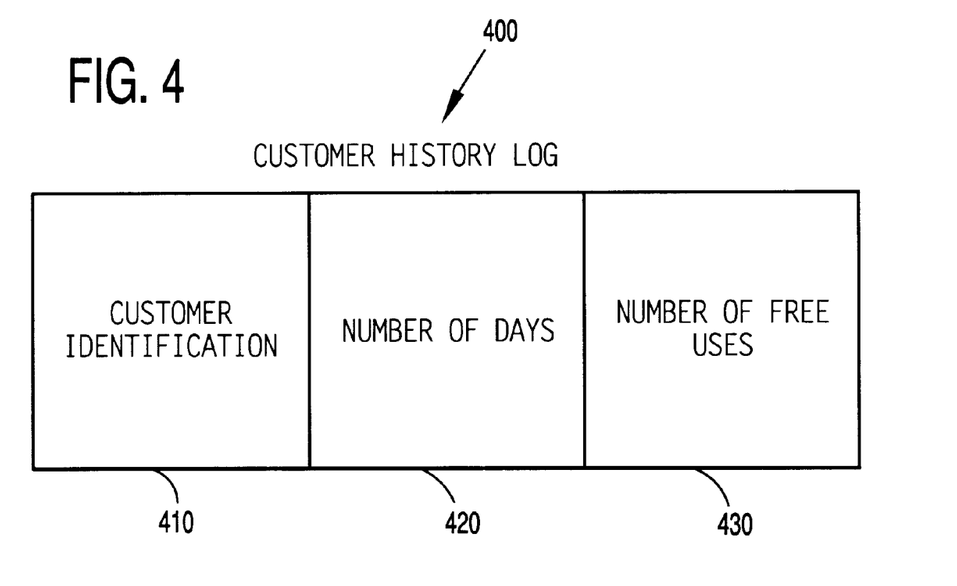
FIG. 4 is simplified block diagram illustrating the preferred data structure of a customer history log in accordance with an exemplary embodiment of the present invention.

Referring now for FIG. 4, the customer history log 400 preferably contains three data fields. The data field 410 contains information which identifies the telephone number or other customer identification. The data field 420 contains information which identifies the number of days the customer has used the service application, and the data field 430 contains information which identifies the number of times the customer has used the given service application 200.

Each time a customer utilizes a given service application, the data fields 420 and 430 are incremented in accordance with the customer's use of the service application 200. The history log 400 is a rolling data record that will continue to grow during the marketing promotion or service application rental period and will stop growing at the end of the stop time of the rental period or at the end of the free uses set up in the GBR. In accordance with an exemplary embodiment, once the marketing promotion or rental period for the given service application 200 expires, the customer history log 400 is erased. Thus, the history log 400 is a temporary data base which exists only during the marketing promotion or service application rental period.

Figure 5:
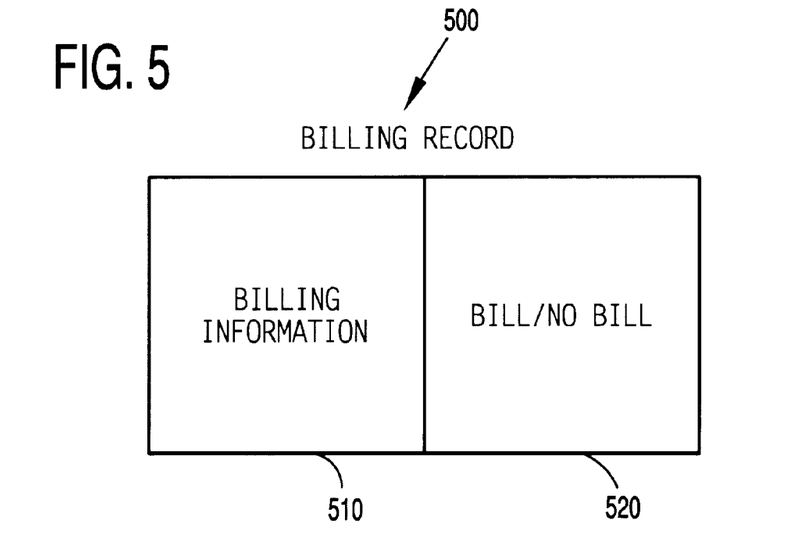
FIG. 5 is simplified block diagram illustrating an exemplary data structure of a telecommunications service billing record in accordance with an exemplary embodiment of the present invention.

After each use of the service application 200 by a given customer, as described above, a billing record 500 is provided to the billing system 60 by the service application 200. The billing record 500, as illustrated in FIG. 5, preferably contains information which identifies data corresponding to the telecommunication service utilized by the customer. In the preferred form shown in FIG. 5, the billing record 500 contains two data fields. The data field 510 contains information which identifies the telecommunications services used by the customer during the telecommunication, such as a telephone call, facsimile transmission, etc., initiated by the customer. As should be understood by those skilled in the art, the data field 510 may contain a number of data fields in which information including the duration of the call, the originating telephone number, the terminating telephone number, long distance services information, telecommunications service provider designation information, and the like. The data field 520 contains information which identifies whether the customer should be billed or not billed for the customer's use of the service application 200.

After the customer history log 400 is compared to the GBR 300 after the customer has used the service application 200, if a determination is made that the customer should be billed for his or her use of the service application 20, information is written to the data field 520 which identifies that the customer should be billed. If on the other hand, the comparison of the customer history log 400 with the information contained in the GBR 300 indicates the customer should not be billed, then the information will be written to the data field 520 which indicates the customer should not be billed. After the appropriate information has been written to the data fields 510 and 520, the billing record 500 may be provided to the billing system 60.

In accordance with an exemplary embodiment of the present invention, once the billing record 500 is provided to the billing system, as described, the bill/no bill field 520 of the billing record governs whether the billing system charges the customer for the customer's use of the service application 200. If desired, the bill generated for the customer may include an entry for the customer's use of the service application 200, but a corresponding cost associated with that entry will only be provided if the field 520 contains information which indicates that the customer should be charged. In a preferred embodiment, the billing record 500 provided by the service application 200, as described, is sent to the SCP 42 where a running bill file is created and maintained. On a periodic basis, the SMS 48 retrieves the running bill file, and likewise, the billing system 60 retrieves on a periodic basis the bill file from the SMS 48.

Operation of an Exemplary Embodiment of the Present Invention

Figure 6:
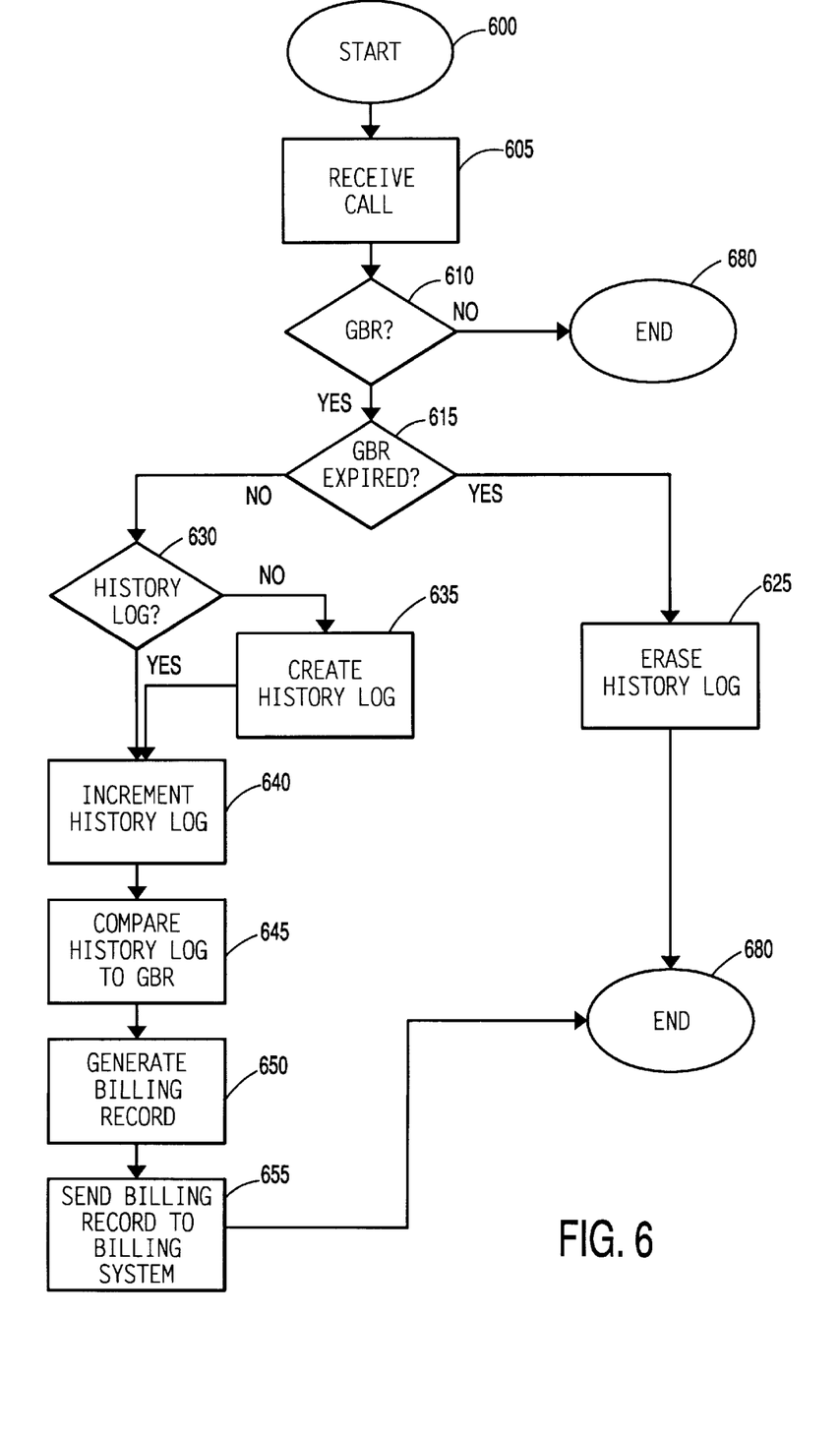
FIG. 6 is a flow diagram illustrating the preferred steps of an exemplary operation of the marketing control program of the present invention.

The method and system of an exemplary embodiment of the marketing control program of the present invention is best illustrated by showing, as an example, how the method and system process a customer's use of a service application program 200, such as call forwarding service. Referring now to the drawings, FIG. 6 is a flow diagram illustrating the preferred steps of an exemplary operation of the marketing control program of the present invention. For purposes of this illustration, numbered hardware components refer to FIG. 1, and data fields refer to FIGS. 3–5.

At step 600, the method begins and moves to step 605. At step 605 the customer receives a call at telephone 21 directed to the customer's telephone number. The customer's central office switch 12 sends a query to the SCP 42 where a determination is made that the customer subscribes to and has selected call forwarding to have the customer's calls forwarded to an alternate telephone number.

Upon activation of the call forwarding service application, the method moves to step 610 where the method determines whether a global billing adjustment record (GBR) 300 is in existence. As described above, the GBR 300 will be in existence if the customer has subscribed to a marketing promotion giving the customer a certain number of free uses of call forwarding, or if the customer has rented use of the call forwarding service for a given period of time. In the present example, the customer has subscribed to the call forwarding service and has been granted ten free uses of the call forwarding service application 200 as a part of the customer's subscription.

As described above, a GBR 300 is prepared in accordance with the customer's subscription in which the data field 310 is set to ten free uses. It should be understood that the telecommunications service provider may also dictate that the promotion will only run a certain number of days, and accordingly, will write a definite number of days, a start time and stop time into the data fields 320, 330, and 340 of the GBR 300.

If at step 610, the method determines that GBR 300 does not exist, the method proceeds to step 680 where the method ends. If the method ends at step 680, the customer's use of the call forwarding service application is rendered under conventional terms such as use under a non-promotional or non-rented subscription of the call forwarding service. In the present example, at step 610, a determination is made that a GBR 300 is in existence in which the grant of ten free uses has been written. Accordingly, the method follows the "Yes" branch to step 615 where a determination is made as to whether the marketing promotion has expired. This determination is made by checking whether the number of days allocated for the promotion has elapsed, whether the stop time of the promotion period has been reached, or whether the number of free uses of the service application has been reached.

If at step 615, a determination is made that the promotion has expired, the method proceeds to step 625 where the history log 400 is erased due to the expiration of the marketing promotion. The method then proceeds to step 680 where the call is processed under conventional terms, as described above.

In the present example, at step 615 a determination is made that the marketing promotion has not expired. The method then proceeds along the "No" branch to step 630. At step 630 a determination is made as to whether a customer history log 400 has been created. It should be understood by those skilled in the art that if this is the first use of the call forwarding service application by the customer, in accordance with the marketing promotion, a history log 400 will not exist yet. If at step 630 a customer history log 400 does not exist, the method proceeds to step 635 where a customer history log 400 is created, as described above.

At step 640, the customer history log 400 is incremented based on the customer's present use of the call forwarding service application 200. That is, the data field 430 of the customer history log 400 is incremented by one use. The data field 420 is incremented by one day of use.

The method then proceeds to step 645 where the data contained in the customer history log 400 is compared to the data contained in the GBR 300. In accordance with the present example, the data field 310 in the GBR 300 contains information which indicates that the customer has been granted ten free uses of the call forwarding service application, and the data field 430 of the customer history log 400 now contains information which indicates that the customer has now used the call forwarding service once. Accordingly, in the present example, the comparison of the customer history log 400 to the GBR 300 results in a determination that the customer has used one of ten free uses of the call forwarding service application 200. It should be understood, that if the marketing promotion had been set up to grant the customer a certain number of days of free use of the call forwarding service, then the customer's current total number of days of use of the call forwarding service would be compared to the number of days of free use granted and identified in the GBR 300.

The method then moves to step 650 where a billing record 500 is generated. At step 655 the billing record 500 is sent to the SCP 42 where the information is added to a running billing file for this customer. In the present example, the customer has used only one of ten free uses granted to the customer in accordance with the marketing promotion. Accordingly, the data field 520 of the billing record 500 is marked with data which indicates that the customer should not be charged for the customer's present use of the call forwarding service application 200. As described above, the SMS 48 will obtain the running billing file information from the SCP 42 on a periodic basis, and the billing system 60 will then retrieve the billing information from the SMS 48 on a periodic basis.

As described herein, the billing system 60 will subsequently use the information provided in accordance with the present invention to create a bill for the customer. No adjustment of the billing system 60 will be required by personnel of the telecommunications service provider because the billing system 60 will have been instructed in advance to place an entry into the customer's bill corresponding to the customer's present use of the call forwarding service application, and the data included in the data field 520 will instruct the billing system 60 that the billing entry will not include a corresponding charge for the use of the service application. Therefore, the billing system's operation remains generic in that the billing system will not be required to make adjustments based on individual uses of different service applications by a number of different customers. The determination of whether the customer is to be charged or not will have been made at the service application level.

Advantageously, the present invention provides a method and system for dynamically and efficiently managing billing information for service application usage at the service application level rather than at the billing system level. The method and system of the present invention serve as screening mechanisms between the particular service application and the billing system so that information received by the billing system defines whether each use of the particular service by a given customer is to be charged to the customer or not. Accordingly the billing system can remain generic, as no adjustments to the billing system will be required to account for promotional or rented uses of particular service applications.

What is claimed is:

1. A method for managing billing information associated with the use of a telecommunications service application, comprising the steps of:
   creating a first record for containing information representing use parameters of the service application;
   creating a second record for containing information associated with use of the service application;
   updating information contained in the second record upon use of the service application;
   comparing information contained in the second record to information contained in the first record; and
   in response to the step of comparing information contained in the second record to information contained in the first record, determining whether to generate a charge associated with the use of the application.

2. The method of claim 1, further comprising the steps of:
   if a determination is made to generate a charge, generating a billing record containing information which indicates a charge should be generated;
   if a determination is made not to generate a charge, generating a billing record containing information which indicates a charge should not be generated; and
   sending the billing record to a billing system.

3. The method of claim 2, further comprising the step of:
   deleting the second record at a stop time, the stop time being a use parameter represented by information contained in the first record.

4. The method of claim 1, wherein the step of updating the second record upon use of the service application includes incrementing a count of uses of the service application after each use of the service application.

5. The method of claim 4, wherein the step of comparing the information contained in the second record to the information contained in the first record includes comparing the count of uses of the service application to a maximum number of available uses represented by information contained in the first record.

6. The method of claim 5, further comprising the step of:
   deleting the second record on the next use of the service application after the maximum number of available uses has been reached.

7. The method of claim 1, wherein the step of updating the second record upon use of the service application includes incrementing a count of the periods of use of the service application after each use of the service application.

8. The method of claim 7, wherein the step of comparing the information contained in the second record to the information contained in the first record includes comparing the count of the periods of use of the service application to a maximum number of available periods of use represented by information contained in the first record.

9. The method of claim 8, further comprising the step of:
   deleting the second record on the next use of the service application after the maximum number of available periods of use of the service application has been reached.

10. In a telecommunications system, a method for managing billing information associated with the use of a telecommunications service application, comprising the steps of:
   receiving a communication requiring the service application;
   determining whether use of the service application is governed by a set of parameters represented by information contained in a billing adjustment record;

if the use of the service application is governed by the set of parameters, creating a customer history log for containing information associated with the use of the service application;

updating information contained in the customer history log for the use of the service application by the communication requiring the service application; and comparing the information contained in the customer history log with the set of parameters to determine whether to generate a charge for use of the service application.

11. The method of claim 10, further comprising the steps of:

if a determination is made to generate a charge, generating a billing record containing information which indicates a charge should be generated;

if a determination is made not to generate a charge, generating a billing record containing information which indicates a charge should not be generated; and sending the billing record to a billing system of the telecommunications system.

12. In an intelligent switched telecommunications network, a system for managing billing information associated with the use of a telecommunications service application, comprising:

a telecommunications network component being operative to create a first record for containing information representing use parameters of the service application;

to create a second record for containing information associated with use of the service application;

to update information contained in the second record upon use of the service application;

to compare information contained in the second record to information contained in the first record; and in response to step of comparing information contained in the second record to information contained in the first record, to determine whether to generate a charge associated with the use of the application.

13. The system of claim 12, wherein the telecommunications network component is further operative to generate a billing record containing information which indicates a charge should be generated, if a determination is made to generate a charge;

to generate a billing record containing information which indicates a charge should not be generated, if a determination is made not to generate a charge; and to send the billing record to a billing system.

14. A system for managing billing information associated with the use of a telecommunications service application, comprising:

a telecommunications network component being operative to create a first data structure having a first data field containing data representing a maximum number of available uses of the service application;

to create a second data structure having a second data field containing data representing a count of the number of uses of the service application;

to write data to the second data field to increment the count of the number of uses upon a use of the service application;

to compare the data contained in the second data field of the second data structure to the data contained in the first data field of the first data structure;

in response to comparing the data contained in the second data field of the second data structure to the data contained in the first data field of the first data structure, to determine whether to generate a charge associated with the use of the application;

if a determination is made to generate a charge, the telecommunications network component being operative to generate a third data structure having a third data field containing data representing an instruction to generate a charge; and if a determination is made not to generate a charge, the telecommunications network component being operative to generate a third data structure having a third data field containing data representing an instruction not to generate a charge.

* * * * *